US011271619B2

(12) United States Patent
Choi et al.

(10) Patent No.: US 11,271,619 B2
(45) Date of Patent: Mar. 8, 2022

(54) METHOD FOR MANAGING BEAM CONSIDERING CHARACTERISTICS OF THZ ANTENNA

(71) Applicant: LG ELECTRONICS INC., Seoul (KR)

(72) Inventors: Kukheon Choi, Seoul (KR); Jiwon Kang, Seoul (KR); Hojae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/273,816

(22) PCT Filed: Sep. 7, 2018

(86) PCT No.: PCT/KR2018/010474
§ 371 (c)(1),
(2) Date: Mar. 5, 2021

(87) PCT Pub. No.: WO2020/050437
PCT Pub. Date: Mar. 12, 2020

(65) Prior Publication Data
US 2021/0344382 A1    Nov. 4, 2021

(51) Int. Cl.
*H04L 5/12*        (2006.01)
*H04B 7/0426*   (2017.01)
*H04B 7/0456*   (2017.01)
*H04B 7/06*       (2006.01)
*H04W 72/04*    (2009.01)
*H04W 72/10*    (2009.01)

(52) U.S. Cl.
CPC ........... *H04B 7/043* (2013.01); *H04B 7/0473* (2013.01); *H04B 7/0639* (2013.01); *H04W 72/046* (2013.01); *H04W 72/10* (2013.01)

(58) Field of Classification Search
CPC .... H04B 7/043; H04B 7/0639; H04B 7/0473; H04W 72/046; H04W 72/10
USPC ......................................................... 375/262
See application file for complete search history.

(56) References Cited

U.S. PATENT DOCUMENTS

| 7,230,931 B2 | 6/2007 | Struhsaker | |
| 2006/0217158 A1* | 9/2006 | Uwano | ................ H04B 7/0617 455/562.1 |
| 2018/0083680 A1* | 3/2018 | Guo | ...................... H04L 5/0048 |
| 2018/0294863 A1* | 10/2018 | Nilsson | ................ H04B 7/0408 |

(Continued)

FOREIGN PATENT DOCUMENTS

| KR | 1020150000304 A | 1/2015 |
| KR | 1020150003827 A | 1/2015 |

OTHER PUBLICATIONS

Samsung, "RS options for P1 beam management", 3GPP TSG RAN WG1 89, May 15-19, 2017, R1-1707982.

*Primary Examiner* — Helene E Tayong
(74) *Attorney, Agent, or Firm* — Dentons US LLP

(57) ABSTRACT

In the present invention, disclosed are a method and terminal for performing beam management in a wireless connection system. In particular, the terminal comprises a radio frequency (RF) unit and a processor, and the processor controls the RF unit to receive information including a beam management region from a base station, wherein the beam management region may comprise a reference signal (RS) and preamble region, a first transition time region for transmission beam steering, and a second transition time region for reception beam steering.

14 Claims, 20 Drawing Sheets

(56) References Cited

U.S. PATENT DOCUMENTS

| | | | |
|---|---|---|---|
| 2019/0037426 A1* | 1/2019 | Yu | H04W 72/046 |
| 2019/0132109 A1* | 5/2019 | Zhou | H04L 5/001 |
| 2020/0275492 A1* | 8/2020 | Lei | H04L 5/0053 |
| 2020/0367167 A1* | 11/2020 | Nam | H04W 76/28 |
| 2021/0067981 A1* | 3/2021 | Nilsson | H04W 72/046 |
| 2021/0167930 A1* | 6/2021 | Jeon | H04L 5/0094 |

* cited by examiner (a)

(b)

(a)

(b)

(c)

| Window # | Bandwidth [GHz] | Center Frequency [GHz] |
|---|---|---|
| I | 76 | 338 |
| II | 58 | 414 |
| III | 62 | 484 |
| IV | 85 | 669 |
| V | 94 | 855 |

METHOD FOR MANAGING BEAM CONSIDERING CHARACTERISTICS OF THZ ANTENNA

This application is the National Stage filing under 35 U.S.C. 371 of International Application No. PCT/KR2018/010474, filed on Sep. 7, 2018, the contents of which is hereby incorporated by reference herein in its entirety.

TECHNICAL FIELD

The present disclosure relates to wireless communications, and more particularly, to a method of managing a beam in consideration of THz antenna characteristics and user equipment therefor.

BACKGROUND ART

In case of introducing a new Radio Access Technology (RAT), more communication devices require larger communication capacity, whereby the necessity for mobile broadband communications enhanced in comparison to the legacy RAT is rising.

Meanwhile, in the antenna configuration of THz band over 100 GHz, RF frontend, antenna, lens and/or waveguide may be basically combined together depending on RF capability of a User Equipment (UE). The THz beam structure may appear in form different from a beam structure operational in a legacy communication system. Therefore, the demand for the beam management suitable for such a structure is rising.

DETAILED DESCRIPTION OF DISCLOSURE

Technical Tasks

One technical task of the present disclosure is to provide a beam management method appropriate for a THz antenna structure.

For the beam management appropriate for the THz antenna structure, the present disclosure intends to provide an antenna structure for the THz beam gain and steering enhancement, and also intends to newly provide a beam management region of a message transceived between a Base Station (BS) and a User Equipment (UE).

Technical tasks obtainable from the present disclosure are non-limited the above-mentioned technical task. Additionally, other unmentioned technical tasks can be clearly understood from the following description by those having ordinary skill in the technical field to which the present disclosure pertains.

Technical Solutions

In one technical aspect of the present disclosure, provided is a user equipment in performing beam management in a wireless communication system, the user equipment including a Radio Frequency (RF) unit and a processor configured to receive information including a beam management region from a base station by controlling the RF unit, wherein the beam management region comprises a Reference Signal (RS) and preamble region, a first transition time region for Tx (transmitted) beam steering, and a second transition time region for Rx barn steering.

The information including the beam management region may have a transmission priority lower than that of transmission/reception of a transmission region for an initial access and higher than that of transmission/reception of a different downlink and uplink channel.

The RF unit may further include at least one of an external lens, a hyper-hemispherical lens, a phase shifter, or an attenuator.

The processor may further include a mechanical beam steering controller and the mechanical beam steering controller may secondarily steer a primarily steered beam by controlling the external lens.

Advantageous Effects

According to an embodiment of the present disclosure, a method of performing beam management of a use equipment in a wireless access system may improve communication performance through a THz antenna structure capable of efficiently performing beam steering and a beam management region of a message appropriate for the THz antenna structure.

Effects obtainable from the present disclosure are non-limited the above-mentioned technical effect. Additionally, other unmentioned effects can be clearly understood from the following description by those having ordinary skill in the technical field to which the present disclosure pertains.

DESCRIPTION OF DRAWINGS

The accompanying drawings, which are included to provide a further understanding of the disclosure, illustrate embodiments of the disclosure and together with the description serve to explain the principle of the disclosure.

BEST MODE FOR DISCLOSURE

Figure 1:
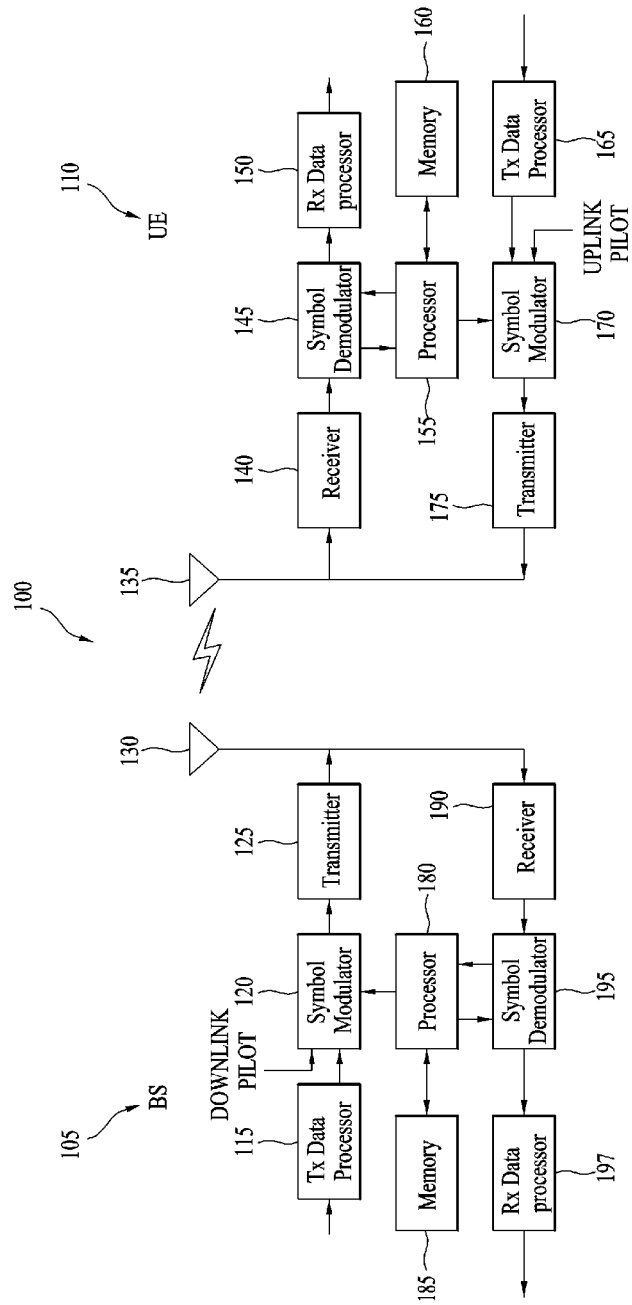
FIG. 1 is a diagram showing configurations of a base station 105 and a user equipment 110 in a wireless communication system 100.

Reference will now be made in detail to the preferred embodiments of the present disclosure, examples of which are illustrated in the accompanying drawings. In the following detailed description of the invention includes details to help the full understanding of the present disclosure. Yet, it is apparent to those skilled in the art that the present disclosure can be implemented without these details. For example, the following detailed description is specifically described assuming that the mobile communication system is 3GPP LTE/LTE-A system or 5G system, but is applicable to any other mobile communication system except for the specific features of 3GPP LTE/LTE-A.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

In addition, in the following description, it is assumed that a terminal is a mobile or fixed user stage device such as a User Equipment (UE), a Mobile Station (MS), an Advanced Mobile Station (AMS), and the like. Besides, it is assumed that a base station refers to any node of a network stage in communication with a terminal, such as a Node B, an eNode B, a Base Station (BS), an Access Point (AP), a gNode B (gNB), and the like.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following technologies may be used in a variety of wireless access systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. CDMA may be implemented in a radio technology such as Universal Terrestrial Radio Access (UTRA) or CDMA2000. TDMA may be implemented in wireless technology such as Global System for Mobile Communications (GSM)/General Packet Radio Service (GPRS)/Enhanced Data Rates for GSM Evolution (EDGE). OFDMA may be implemented with wireless technology such as IEEE 802.11 (Wi-Fi), IEEE 802.16 (WiMAX), IEEE 802-20, Evolved UTRA (E-UTRA), and the like. UTRA is part of a Universal Mobile Telecommunications System (UMTS). 3rd Generation Partnership Project (3GPP) Long Term Evolution (LTE) employs OFDMA in downlink as a part of an Evolved UMTS (E-UMTS) that uses E-UTRA and SC-FDMA in uplink. LTE-A (Advanced) is an evolved version of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a block diagram for configurations of a base station 105 and a user equipment 110 in a wireless communication system 100.

Although a single base station 105 and a single user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received (Rx) data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes a single transceiving antenna 130/135 in the drawing, each of the base station 105 and the user equipment 110 includes a plurality of antennas. Therefore, each of the base station 105 and the user equipment 110 of the present disclosure supports an MIMO (multiple input multiple output) system. And, the base station 105 according to the present disclosure may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of Frequency Division Multiplexing (FDM), Orthogonal Frequency Division Multiplexing (OFDM), or Code Division Multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the Tx antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the Tx antenna 135. The transmitter and the receiver in each of the user equipment and the base station may be configured as a single Radio Frequency (RF) unit.

In the base station 105, the uplink signal is received from the user equipment 110 via the Rx antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be referred to as one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

THz and Lens

According to one of the greatest features of TeraHertz (THz) propagation, there is almost no loss for material transmission of dielectrics and the like. Table 1 below shows the property at 1 THz of a representative material, and Table 2 shows index of refraction and power absorption at 0.2~2 THz of several materials.

TABLE 1

| Material Type | Optical Property |
| --- | --- |
| liquid water | high absorption<br>($\alpha \approx 250$ cm$^{-1}$ at 1 THz) |
| metal | high reflectivity<br>(>99.5% at 1 THz) |
| plastic | low absorption<br>($\alpha < 0.5$ cm$^{-1}$ at 1 THz)<br>low refractive index<br>(n ≈ 1.5) |

TABLE 1-continued

| Material Type | Optical Property |
| --- | --- |
| semiconductor | low absorption<br>($\alpha < 1$ cm$^{-1}$ at 1 THz)<br>high refractive index<br>(n ~ 3-4) |

TABLE 2

| Material | Refractive index | Power absorption(Cm$^{-1}$) |
| --- | --- | --- |
| Fused-Silica | 1.952 | 1.5 |
| Sapphire | $n_o$ = 3.070<br>$n_e$ = 3.415 | 1 |
| Intrinsic Ge | 4.002 | 0.5 |
| High-res GaAs | 3.595 | 0.5 |
| Quartz | $n_o$ = 2.108<br>$n_o$ = 2.156 | 0.1 |
| High-res Si | 3.418 | 0.05 |

In Table 1 and Table 2, an absorption coefficient $\alpha$ is related to an imaginary part of a complex refraction index ($\bar{n}$=n+jk), and may be represented as Equation 1 below. In Equation 1, $\lambda$ means a wavelength in a free space.

$$\alpha = \frac{4\pi k}{\lambda} \qquad \text{[Equation 1]}$$

Meanwhile, a delivery about a thickness of a material may be represented as Equation 2 below. In Equation 2, 'x' means a distance from a surface of a material to a specific depth and 'L' means how much loss was generated with reference to 1.

$$L = e^{-\alpha x} \qquad \text{[Equation 2]}$$

Figure 2A:
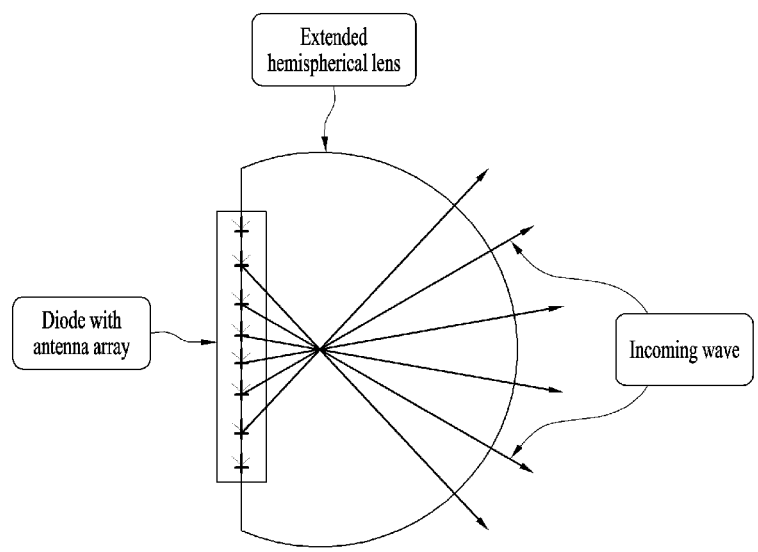
FIGS. 2A to 2C show a THz antenna to which an extended hemispherical lens is applied.
Figure 2B:
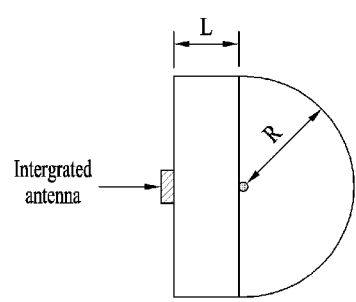
Figure 2C:
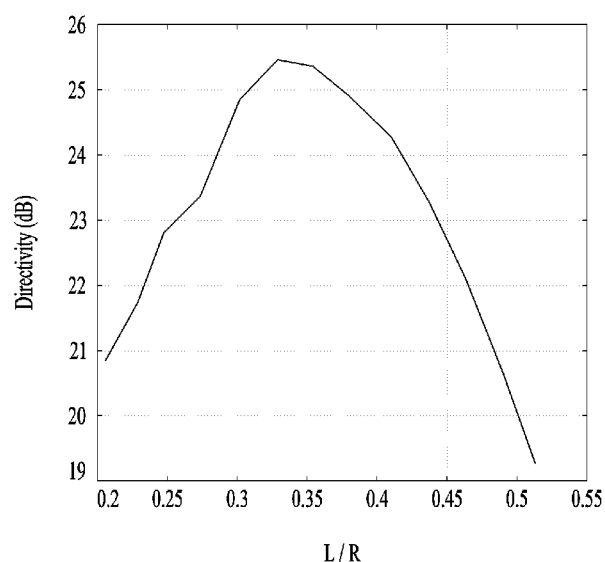

Basically, if it goes toward a high frequency band, a wavelength of a propagation wave gets shorter and capability of enhancing a beam resolution using multiple arrays is increased. When beam steering according to the beam resolution enhancement is demanded, in case of using a phase shifter for each array element, it is necessary to increase the degree of prevision of a phase shifter of a frontend in designing an antenna. Recently, there is an ongoing development of a phase shifter on a high frequency band over 100 GHz. In addition, devised is a method of enhancing beam directivity using a dielectric lens in consideration of THz material property. For example, extended hemispherical lens shown in FIGS. 2A to 2C are devised as THz antenna designs.

Figure 3:
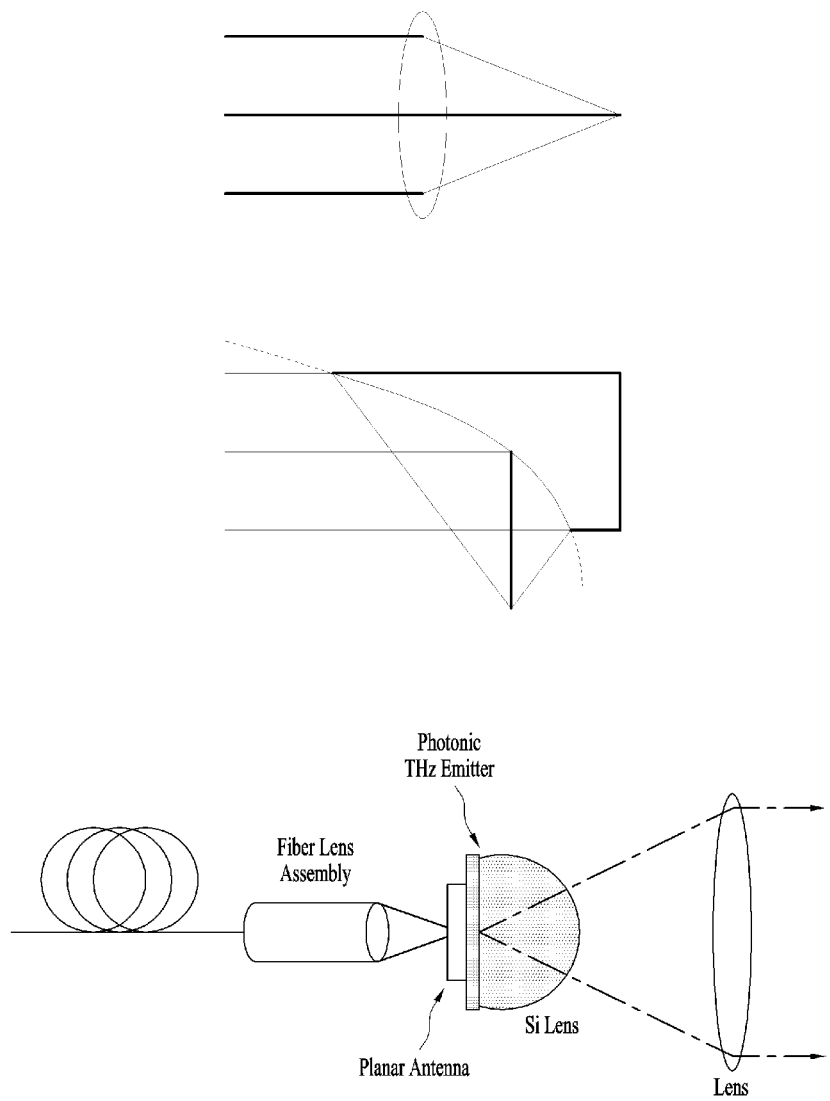
FIG. 3 shows that a lens antenna or mirror is applied to beam steering.

The following description will be made with reference to FIG. 3 together with FIGS. 2A to 2C. Owing to the appearance of the aforementioned lens antenna, plane waves may gather to a prescribed point, which is defined as 'focal point'. FIG. 2A and FIG. 2B shows the lens effects according to the doping of the antenna itself. An independent lens or a mirror configured with a material that causes strong reflection may be used for the lens antenna design. A lens antenna of a special convex lens type may enhance beam directivity or be applied to beam steering, and a mirror may be applied in a manner of being specialized for beam steering.

THz Beam Steering with Lenses

Basically, the antenna structure including THz lenses considers the three methods in the following for beam steering.

1) Beam transition through mechanical steering of an external lens or feeder

2) Beam direction transition through physical property deformation of a lens

Figure 4:
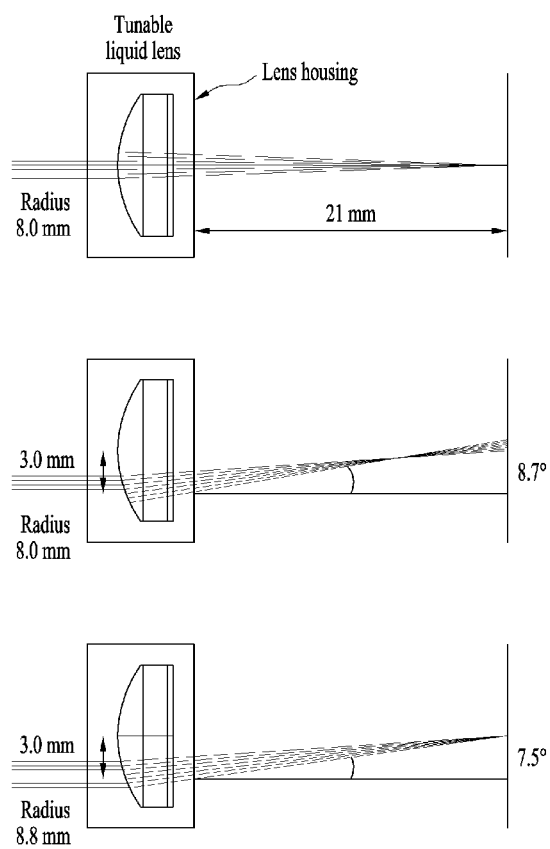
FIG. 4 shows beam steering according to a size and motion of a lens.

3) Arrays selection in consideration of position relationship between antenna arrays and a lens The mechanical method that is the first method may include a method of using scanning mirrors, a method of using rotating prisms, a method using piezo actuators, or a method using a microelectromechanical systems (MEMS) mirror. FIG. 4 shows beam steering according to a size and motion of a lens.

FIG. 4 (a) shows that a 2-mm parallel beam is focused on an image plane. FIG. 4 (b) shows that a focus is blurred in a manner of using a center lens of a 8-mm curvature radius and steering a beam by decentering a lens by 3.0 mm from an optical axis. Here, a steering angle is 8.7°. FIG. 4 (c) shows that a steering angle is changed into 7.5 from 8.7 in a manner that a curvature of a variable focal distance lens is adjusted into 8.8 mm to minimize a spot size.

Such a method of steering a beam by the motions of the lenses and antenna feeder may have some limitations depending on antenna implementation of a UE or BS that uses such an antenna. In addition, such a method is accompanied by problems such as high complexity, alignment sensitivity, low reliability, etc. In addition, if a time generated from mechanical beam steering is defined as a time required for changing a current beam into a next beam, various times appear according to implementations as shown in Table 3 below.

TABLE 3

| Mechanical beam steering device | Steering range | Step response time |
|---|---|---|
| 2D galvanometer scanner [12] | −20~20 degree | About 350 us |

Generally, a steering range through a mechanical beam steering method may be diversified depending on implementation, but a transition operation time becomes longer than that of a non-mechanical beam steering method due to physical operation limit basically.

A non-mechanical method, which is a second or third method, uses a material that can change physical property of a lens. Specifically, there are a method of changing a direction of a beam by changing material property electrically or magnetically and a method of adjusting a direction of propagation transmitted in a manner of differentiating positions of elements of an antenna array joined to a lens and differentiating a position of a signal projected into the lens.

Figure 5:
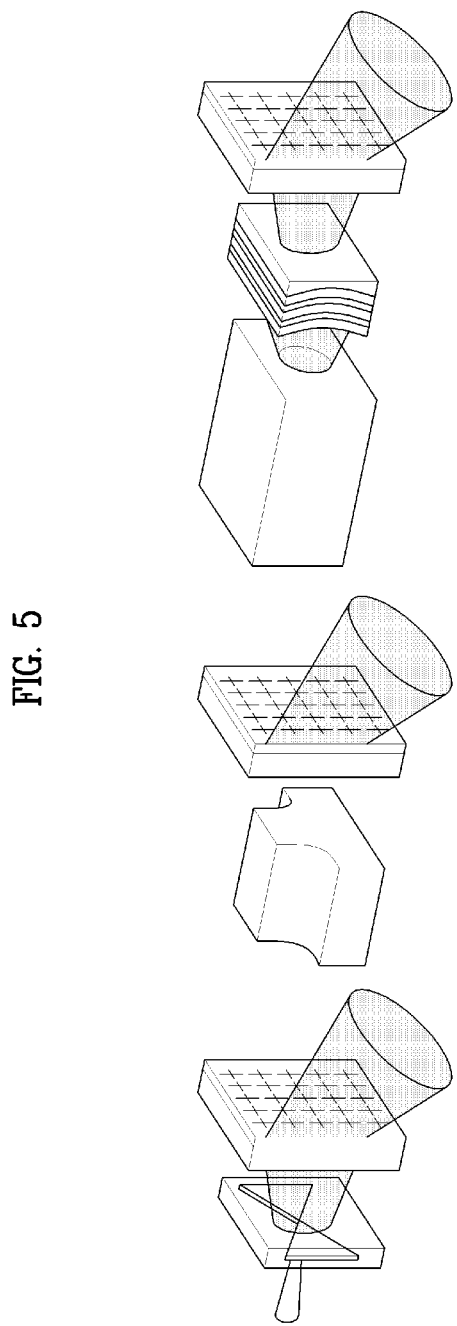
FIG. 5 shows beam direction transition through material property deformation of a lens.

FIG. 5 shows beam direction transition through physical property deformation of a lens. Generally, for beam steering through a change of electromagnetics, a material, of which refractive index is changed through electric or magnetic deformation called metamaterials, is used for a lens antenna.

Specifically, FIG. 5 shows integration compatibility of a beam steering metasurface. The concept of a metasurface, which can be disposed on an output facet of a mmWave, THz, far-infrared radiation, or electromagnetic radiation source, includes, for example, a photoconductive THz source, a solid-state waveguide laser, or a Vertical External Cavity Surface Emitting Laser (VECSEL) for controlling a direction of a generated beam.

In FIG. 5, when a 2-dimensional array of a resonant metasurface unit cells is disposed on an electrically adjustable substrate, a resonant frequency and a transmitted electromagnetic wave are controlled by controlling a current of each metasurface unit cell.

Figure 6:
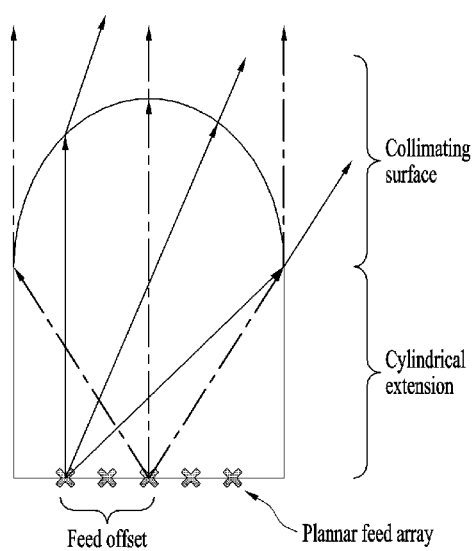
FIG. 6 shows beam steering through element selection of an array attached to a lens.
Figure 7:
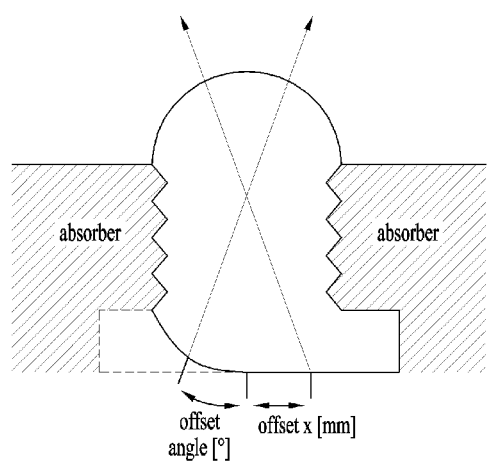
FIG. 7 shows a method of enclosing a lens with an internal reflected absorber and a method of using an array that is not in form of a planar substrate.
Figure 7:
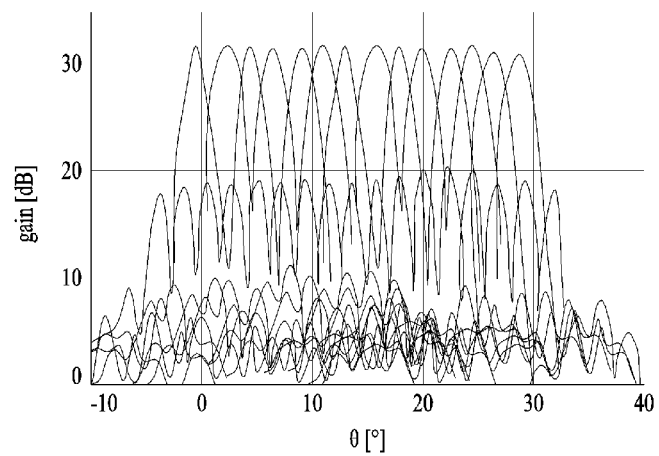

Meanwhile, as another non-mechanical method, as shown in FIG. 6, steering of a beam is enabled by selecting an element of an array attached to a lens. Yet, the bigger a beam steering angle becomes, the less a focusing performance and a beam gain may get. To solve such a problem, as shown in FIG. 7, a method of enclosing a lens with an internal reflected absorber and a method of using an array in form of a non-planar substrate have been proposed. Yet, since a beam steering range through array selection shown in FIG. 7 is limited, the demand for the technical progress of implementation technology for extending a beam steering range is rising.

THz Pulse Generation (Photonic Source Based)

Figure 8:
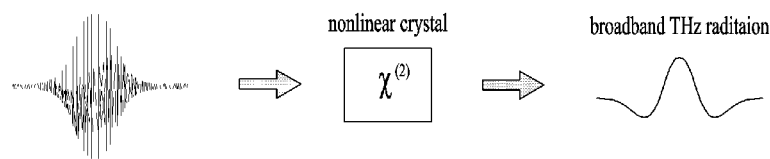
FIG. 8 shows THz pulse generation using an Optical/Electrical (O/E) converter.
Figure 8:
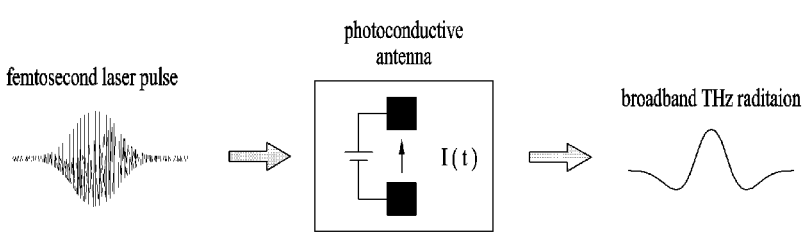
Figure 8:
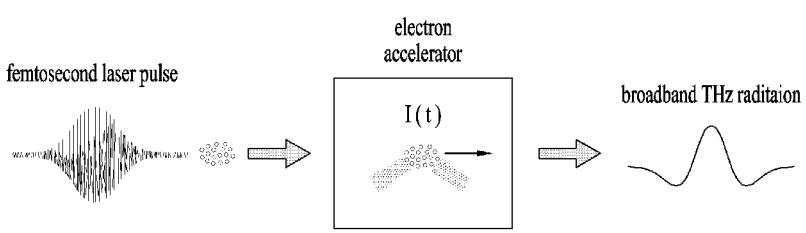

In case of using a photonic source (e.g., an infrared band source) in generating a THz pulse, a method of generating a photonic source using an infrared laser (having about 70-fs sampling resolution) and then modulating it into a THz band is mainly utilized. FIG. 8 shows a device referred to as an Optical/Electrical (O/E) converter. Specifically, FIG. 8 (a) shows optical rectification by nonlinear crystal, FIG. 8 (b) shows O/E conversion by a photoconductive antenna, and FIG. 8 (c) shows emission from bunch of relativistic electrons. The length of a THz pulse generated in form shown in FIG. 8 may include about fs~few ps.

Figure 9:
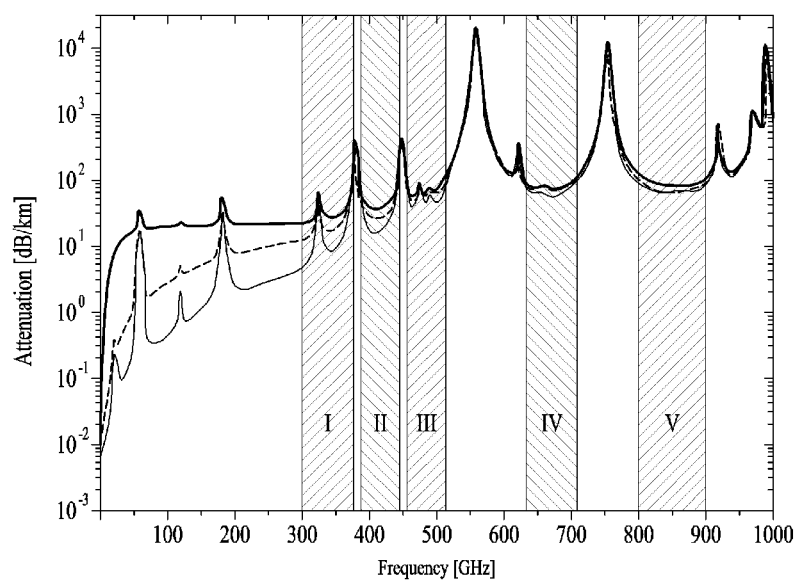
FIG. 9 shows a bandwidth available in consideration of attenuation in a THz spectrum.

FIG. 9 shows a bandwidth available for a reference of attenuation $10^2$ dB/km in a spectrum up to 1 THz with outdoor reference. If a THz pulse length is set to about 50-ps pulse with reference to a single carrier, it may have about 20-GHz BW. If a single pulse length is considered as a single transmission unit, a gap time is a considerably long time from the perspective of a framework reference. Hence, in aspect of transmission efficiency, a resource transmission for THz beam management is handled as a transmission resource lump for beam management preferably and periodicity is designed long advantageously.

Figure 10:
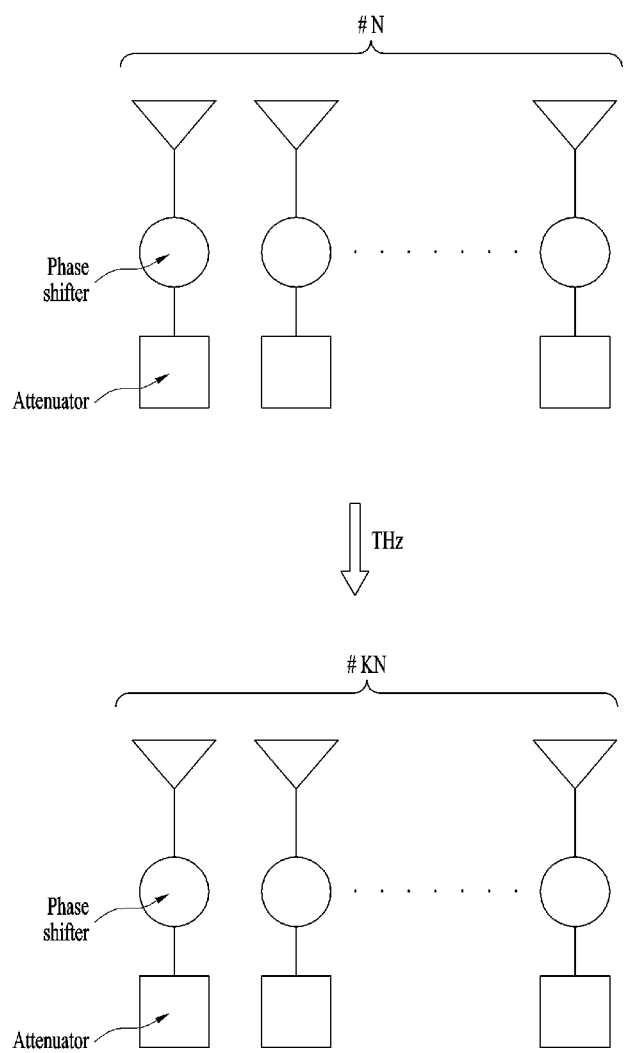
FIG. 10 shows that more antenna elements are buried to apply a legacy antenna structure to a THz band.

In order to apply a legacy antenna structure to 0.3~3 THz, as shown in FIG. 10, it is able to consider burying more antenna elements in the same area (e.g., every wavelength/2). In this case, it is possible to improve a beam gain and generate a sharper beam (100~1,000 times narrower beam).

Yet, since more phase shifters are necessary to implement the antenna structure shown in the right part of FIG. 10, it may cause a problem of cost increase due to the antenna element increase. In addition, as the sharper beam is generated, a beam steering error may increase. In addition, as a frequency increases, insertion loss of a phase shifter increase as well, whereby output efficiency may decrease eventually.

In THz, to solve such problems, it is able to enhance beam directivity using a nonconductor having a low absorption loss for a lens. In addition, beam directivity can be enhanced while the number of antenna elements is decreased. In addition, it is able to consider 'mechanical+non-mechanical beam steering' of a lens.

Although input-to-output power efficiency of an antenna operative over 100 GHz (THz) is known as basically very low, there was possibility that an array 10~100 times can be installed more densely with reference to the same size antenna than the legacy case below 30 GHz. Yet, in order to rapidly reduce PL over 100 GHz, it is not easy to achieve the coverage capable of applying it in form of an array antenna. In addition, it is not easy to design an antenna including dense and precise array arrangement and phase shifters.

However, transmissivity for nonconductor among the medium properties of a THz region is considerably good. If this effect is used, there is possibility in enhancing directivity using a lens formed of the material of good transmissivity. On the other hand, such a lens may be developed in a manner of being designed on an array feed through doping or variously combining independent lenses together. Therefore, if such a lens is used for the antenna design, it is important to enlarge a beam adjustment range and control beam adjustment accuracy.

So far, since the beam adjustment range is limited mechanically or non-mechanically, a beam adjustment range and resolution capability of a UE, which uses a lens, are different depending on antenna capability of a UE of a communication system over 100 GHz. Therefore, the basic beam management over 100 GHz needs to be designed in consideration of such an antenna implementation problem.

In order to secure a maximum beam adjustment range, i.e., beam steering capability, the present disclosure proposes a method of mixing mechanical beam steering and non-mechanical beam steering together. A time taken to move a corresponding beam to a spatially step-moved beam will be referred to as Tm in case of using the mechanical method or Tn in case of using the non-mechanical method. A steering capable range in case of being considered by the mechanical method will be referred to as Km and a steering capable range in case of being considered by the non-mechanical method will be referred to as Kn. If so, 'Tm>Tn' and 'Km>Kn' may be established.

Proposal 1—Device Structure

Figure 11:
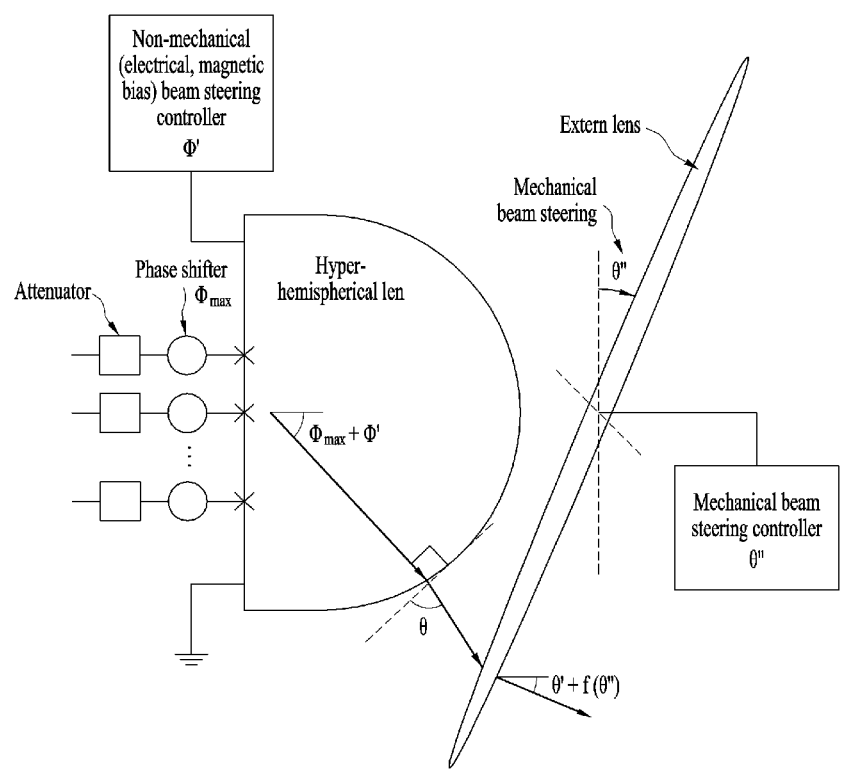
FIG. 11 shows an antenna structure for THz beam gain and steering improvement according to Proposal 1 of the present disclosure.

FIG. 11 shows an antenna structure for THz beam gain and steering enhancement according to Proposal 1 of the present disclosure. Referring to FIG. 11, an RF unit of a UE according to Proposal 1 of the present disclosure may include an external lens, a hyper-hemispherical lens, a phase shifter and an attenuator. In addition, a processor of the UE according to Proposal 1 of the present disclosure may include a non-mechanical beam steering controller and a mechanical beam steering controller. Meanwhile, at least one of the external lens, the hyper-hemispherical lens, the phase shifter and the attenuator may be omitted from the components of the RF unit.

Assuming that a maximum steering angle generated using the phase shifter and the attenuator is $\phi_{max}$, a direction of propagation through a doping lens after passing through the phase shifter is represented as $\phi_{max}+\phi'$. Yet, a transmission angle according to the medium property of the doping lens is assumed as equal to an incident angle. In this case, $\phi'$ may be defined as an angle resulting from steering a beam direction by $\phi'$ through a device referred to as the non-mechanical beam steering controller. A beam propagating through the doping lens comes out at an angle vertical to a tangential direction of a spherical surface area of the hyper-hemispherical lens. In doing so, refraction may occur slightly due to a difference between the doping lens and a free space or air in a medium property (e.g., a refractive index). Assuming that the output beam direction by refraction is $\theta$, it may be represented as $\theta=g(\phi, \phi')$.

Thereafter, the direction of the beam secures directivity through the external lens. In this case, if the external lens is twisted by $\theta''$ through a device referred to as a mechanical beam steering controller of the external lens, a final propagation direction may be finally determined as a sum of $\theta'$ by the medium property (e.g., refractive index) effect of the external lens and $f(\theta'')$ by the mechanical beam steering. The output beam direction in the present structure may be simply represented as Equation 3 below.

$$\rightarrow = h(\phi, \phi', \theta', \theta'') \qquad \text{[Equation 3]}$$

Regarding a final Tx beam direction, a final output beam direction is determined by adjusting a direction $\phi$ twisted by phase shifters, a direction $\phi'$ controlled by the mechanical beam steering controller of the doping lens, a direction $\theta$ generated by a medium difference between the doping lens and the free space or the air on the surface area of the doping lens, a refraction direction $\theta'$ according to the medium property (refractive index) of the external lens, and a bema direction $\theta''$ according to the mechanical beam steering controller of the external lens.

Figure 12:
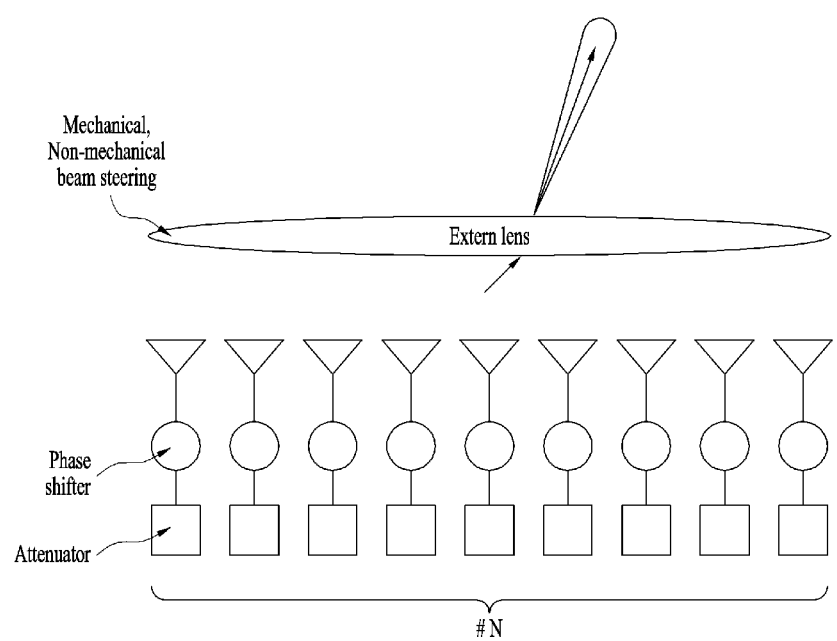
FIGS. 12 to 15 show antenna structures according to partial modifications of the antenna structure of Proposal 1 shown in FIG. 11.
Figure 13:
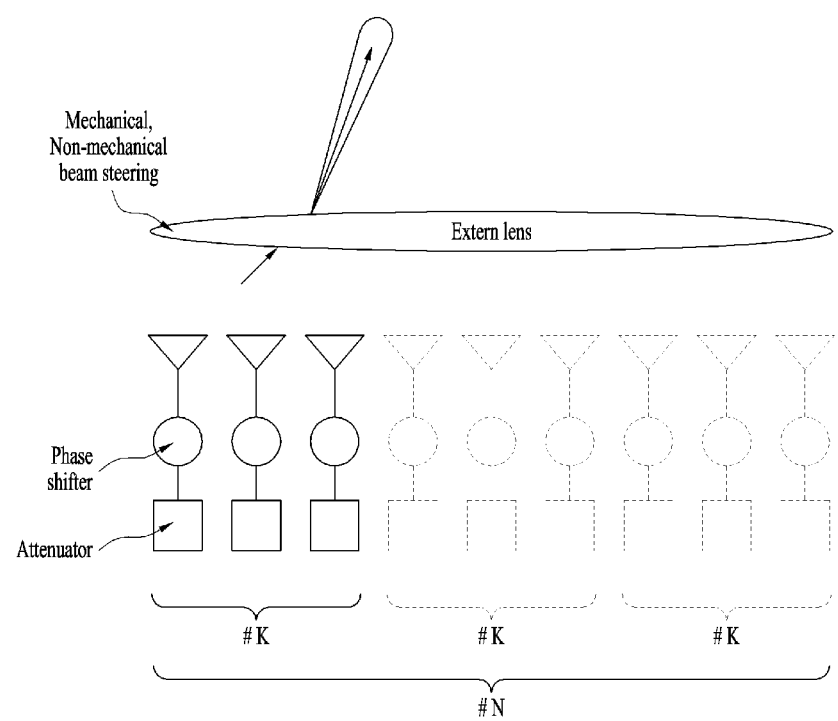
Figure 14:
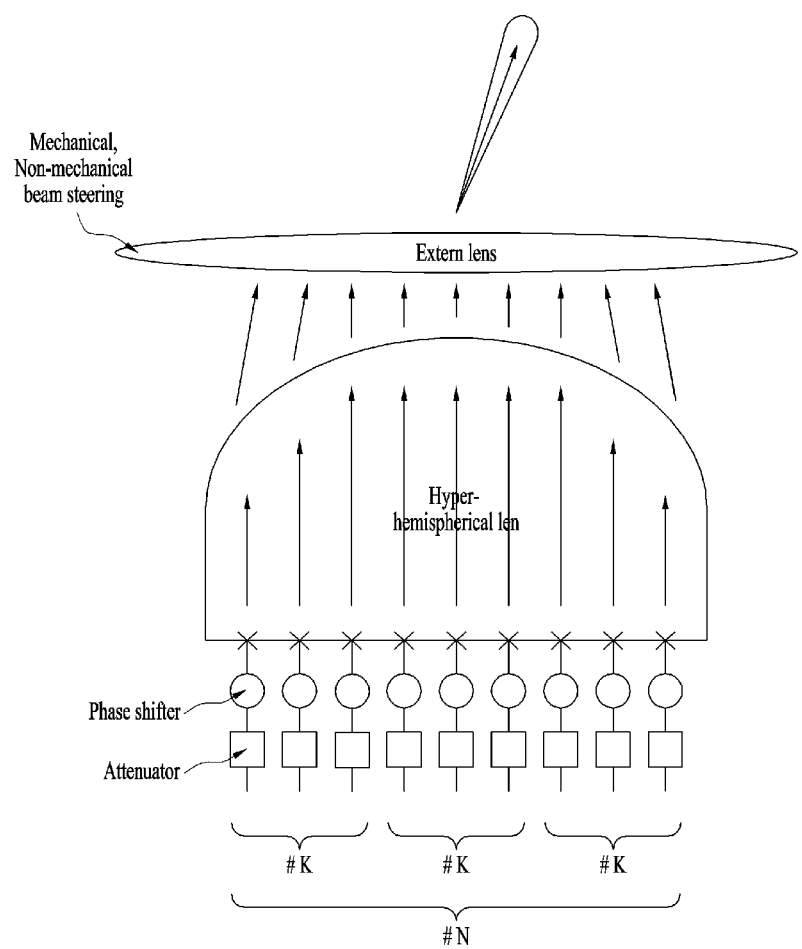
Figure 15:
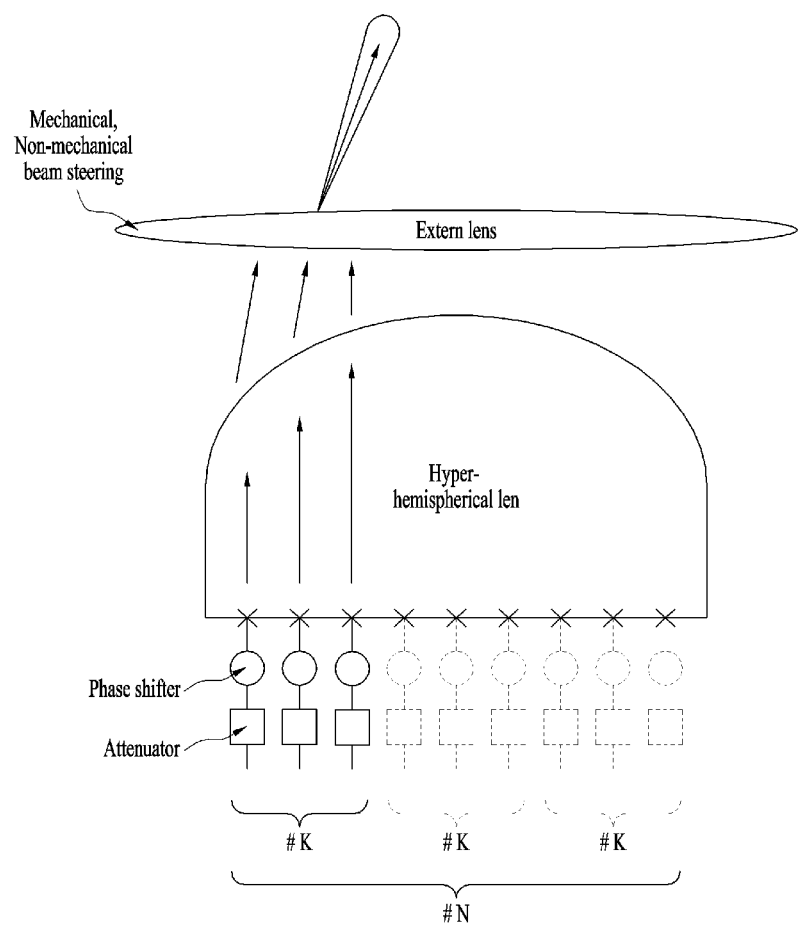

Meanwhile, FIG. 12 shows the beam steering using a phase shifter and an external lens, and more particularly, a combined form of a mechanical method and a non-mechanical method. FIG. 13 shows how to select an antenna group additionally. FIG. 14 shows that a hyper hemispherical lens in the structures of FIGS. 11 to 13 is doped in an antenna substrate for the beam directivity enhancement. FIG. 15 shows that a hyper hemispherical lens in the structure of FIG. 14 is doped in an antenna substrate and that an antenna element group is selected for the beam directivity enhancement.

Proposal 2

According to Proposal 2 of the present disclosure, a UE may receive parameters for a beam management region from a BS through RRC (L3), System Information Block (SIB), Master Information Block (MIB), etc. Information of the parameters may include: 1) starting slot/symbol/frame/subframe and/or radio frame index; 2) beam management region length; and 3) transmission periodicity of beam management region.

As a priority of a beam management region is lower than that of a transmission region for an initial access, a UE may be designed not to send the beam management region in case of collision with an initial access transmission region. Meanwhile, in case that DL and/or UL channel other than an initial access resource and a beam management region collide with each other, it is able to design that the beam management region is transmitted and that other DL and/or UL channel is not transmitted.

Proposal 3

A UE according to one embodiment of the present disclosure may receive parameters for RS(s) or preamble(s) transmission on a beam management region from a BS through RRC (L3), MAC-CE (L2), etc.

Information of a parameter according to one embodiment of the present disclosure may include RS(s) or preamble(s) transmission length (represented as slot/symbol/frame/subframe and/or radio frame number, etc.). In this case, a position of an RS(s) or preamble(s) transmission period may be aligned with a frame structure or may not.

Information of other parameters according to one embodiment of the present disclosure may include a gap (e.g., a zero power resource region length or a non-measure region length) in consideration of a time (i.e., transition time) necessary to switch a current beam to a next beam. The gap may be represented as a slot/symbol/frame/subframe and/or the radio frame number and expressed according to beam steering implementation as follows.

1) Gap required for steering from one beam to another beam in a current panel 1-1) Gap generated according to mechanical beam steering of a lens 1-2) Gap generated according to non-mechanical beam steering of a lens 1-3) Gap generated according to beam steering using a phase shifter 2) Gap required for steering from a beam of a current panel to a beam of another panel If a UE is aware of a beam management region length (K), RS(s)/preamble(s) transmission length (R), and a gap length (G) for a transition time, the total RS(s)/preamble(s) period number (i.e., the number of beams) transmitted in a beam management region can be obtained. Namely, the total RS(s)/preamble(s) period number may be represented as $$M \times N = \frac{K}{R+G}.$$

In this case, M indicates the RS(s)/preamble(s) period number of repeatedly transmitting the same beam within a single BM region, and N indicates the RS(s)/preamble(s) period number of transmission by steering from one beam to another beam within a BM region.

Proposal 4

Figure 16:
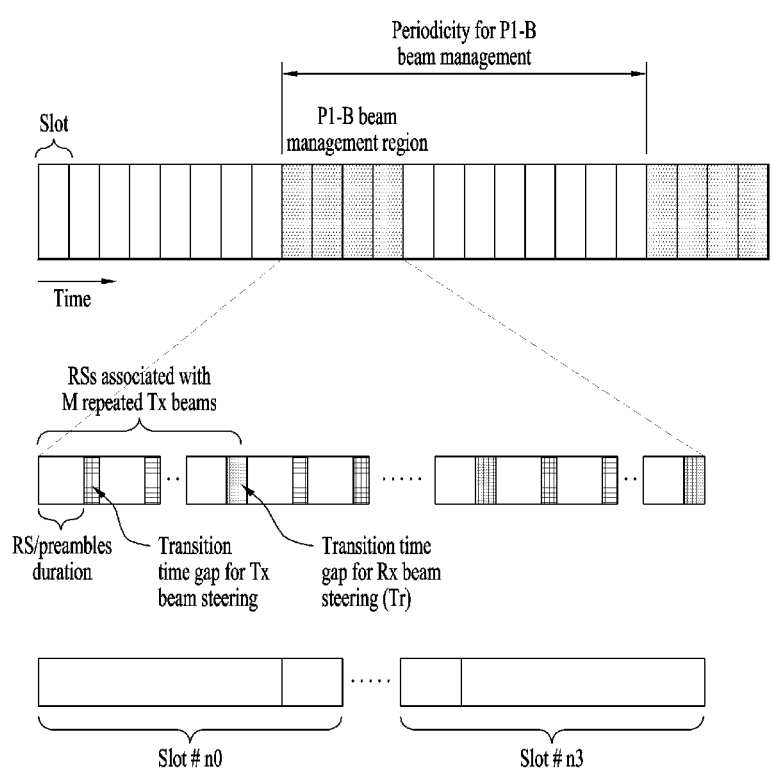
FIG. 16 shows a structure of a beam management region according to Proposal 4 of the present disclosure.

According to Proposal 4 of the present disclosure shown in FIG. 16, a UE receives parameters for properties (e.g., whether to transmit a beam repeatedly, information on an inter-beam gap, etc.) of a beam mapped to an RS or preambles within a beam management region from a BS through RRC (L3), MAC-CE (L2), etc. particularly, FIG. 16 shows a BM region for a P1-B operation and an RS(s)/preamble(s) configuration example (i.e., 4 slots and an example of not being aligned with a corresponding frame structure). Informations of the parameters are described below.

Type 1. A Tx beam is changed per RS/preambles transmission length in a beam management region (P2).

Type 2. A Tx beam is repeated in all RS/preambles transmission lengths of a beam management region (P3).

Type 3. A beam is changed in N RS/preambles of a beam management region, and this is repeated M times (P1-A).

Type 4. A beam is repeated in M RS/preambles transmission lengths of a beam management region, and this is changed N times (P1-B).

Proposal 5

Figure 17:
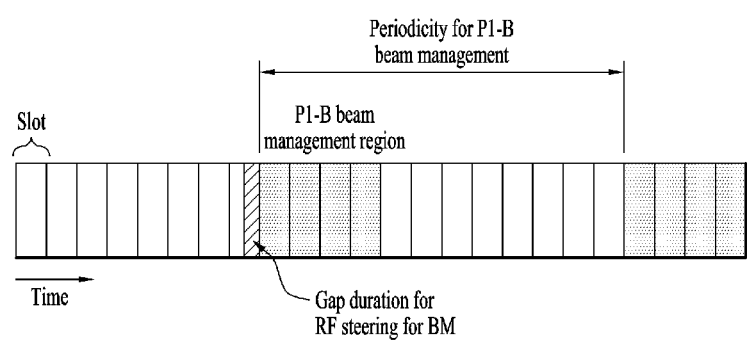
FIG. 17 shows a gap duration for preparation of beam steering ahead of a beam management region according to Proposal 5 of the present disclosure.

According to Proposal 5 of the present disclosure shown in FIG. 17, a gap duration for TF adjustment for the beam steering preparation may be configured right ahead of a beam management region through RRC (L3), MAC-CE (L2), etc. The gap duration may be represented as slot/symbol/frame/subframe and/or the number of radio frames.

Proposal 6-1

Proposal 6-1 of the present disclosure will be described with reference to Table 4 below. A UE may receive time/frequency disposition information of a reference signal according to: 1) a Tx beam steering maximum range K (degree) of a BS; 2) a maximum steering available beam number M within the Tx beam maximum range K; 3) a maximum gap time (transition time) required for steering with a single step beam (e.g., Tm in case of mechanical beam steering, Tn in case of non-mechanical beam steering); and/or 4) a beam management period T_total to find an optimal Tx/Rx beam pair within the Tx beam steering maximum range K through higher layer (RRC), System Information Block (SIB), or Master Information Block (MIB). The above information may be configured in form of joint encode. In the above information configuration, a beam steering maximum range may indicate a range of a single cell in case of an initial access. Therefore, beam management ability information may be provided to UEs on beam management in consideration of the maximum steering available bema number M, the maximum gap time T required for steering, and/or the BM period T_total for finding an optimal Tx/Rx beam pair. Meanwhile, the transition time T and the T_total may be substituted with the number of frames/slots/subframes/symbols and the like on the corresponding system frame structure.

TABLE 4

| Beam management ability information index | Tx beam steering maximum range K (degree) of gNB | Maximum steering available beam number M within Tx beam steering maximum range K | Maximum time (transition time) T required for steering with single Tx step beam | BM period T_total for finding optimal Tx/Rx beam pair within Tx beam steering maximum range K |
|---|---|---|---|---|
| 00 | 10 degrees | 10 | 100 ns | 10 μs |
| 01 | 20 degrees | 100 | 60 ns | 10 μs |
| 10 | 30 degrees | 300 | 50 ns | 10 μs |
| 11 | 40 degrees | 1000 | 50 ns | 10 μs |

Proposal 6-2

Proposal 6-2 of the present disclosure will be described with reference to Table 4 below. Information (P1: BS Tx beam and UE Rx beam steering, P2: BS Tx beam steering only, P3: UE Rx beam steering only) indicating a beam management operation is transmitted through higher layer (RRC) for a periodic time operation, L2 (MAC-CE) for a semi-persistent operation, or L1 (DCI) for an aperiodic operation, and thus P1, P2 and P3 beam managements are operated. The beam management ability information on each of the P1, P2 and P3 operations is transmitted through L3 (higher layer, RRC), SIB or MIB. The beam management operation may be performed in a manner of configuring a beam management region (e.g., time/frequency region in which RSs/preambles for beam management are transmitted) and then triggering the region, in which the triggering may be performed in form of L3 (RRC), L2 (MAC-CE) and/or L1 (DCI). P1 may form TS(s)/preamble(s) period of a BM region in form of the P1-A or the P1-B.

TABLE 5

| P1-B beam management ability information index | Tx beam steering maximum range K (degree) of gNB | Maximum steering available beam number M within Tx beam steering maximum range K | Maximum time (transition time) T required for steering with single Tx step beam | Rx beam steering maximum available beam number Mr | Maximum time Tr required for steering with single Rx step beam | BM period T_total for finding optimal Tx/Rx beam pair within Tx beam steering maximum range K for P1-B operation |
|---|---|---|---|---|---|---|
| 00 | 10 degrees | 10 | 100 ns | 5 | 1 μs | 100 μs |
| 01 | 20 degrees | 100 | 60 ns | 5 | 0.5 μs | 100 μs |
| 10 | 30 degrees | 300 | 50 ns | 10 | 1 μs | 100 μs |
| 11 | 40 degrees | 1000 | 50 ns | 10 | 1 μs | 100 μs |

A UE may determine whether a beam management operation is possible depending on beam management ability information of a BS in a beam management resource region. The UE capable of the corresponding beam management may perform the beam management operation according to a corresponding frame mechanism.

Figure 18:
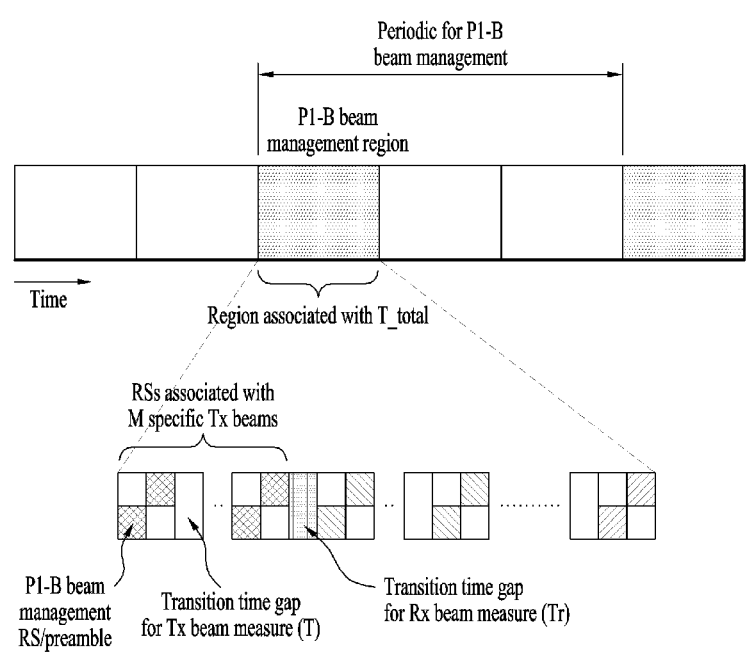
FIG. 18 shows that a periodic beam management region for P1 operation is configured according to Proposal 6-2 of the present disclosure.

FIG. 18 shows that a periodic beam management region for a P1 operation is configured according to Proposal 6-2 of the present disclosure. FIG. 18 shows an example that a region for the usage of beam management for a corresponding P1 is configured periodically. And, a transmission length of the beam management region may be determined depending on a T_total value designated by a BS. If a P1-B beam management ability information index in Table 5 is 00, T_total becomes 100 μs, which becomes a P1-B beam management region. The present T_total 100 μs may be replaced by the frame/slot/subframe number on a corresponding frame structure. In this case, as 10 Tx beams of a BS are paired with 5 Rx beams of each UE, total 50 per-instance RSs/preambles are transmitted. Total 6-μs gap is included as total of 'BS Tx beam transition gap 0.1×10=1 μs' and 'UE Rx beam transition gap 1×5=5 μs', whereby a single Tx/Rx beam pair is maintained for '94 μs/50=1.88 μs' and RSs/preambles for the P1-B beam management are transmitted.

Rx beam number Mr is 5, 11-μs Tx beam sweeping is performed 5 times so as to result in total 55 μs. As a transition time (e.g., 1 μs) for Rx beam sweeping comes 5 times among the 5 times of the Tx beam sweeping, the beam management region T_total for a 60-μs P1-B operation is configured.

Proposal 6-3

A UE may not be satisfied with beam management ability configured by a BS. Namely, if it is impossible to measure all beam pairs with T_total configured by a BS due to a lot of beam pairs in a beam management region or the number of RSs/preambles allocated during a short time in which a beam pair is maintained is insufficient, a UE may operate as follows.

Firstly, a UE does not perform a beam management operation during a configured beam management region. Yet, the UE may send a message that makes a request for relaxed beam management ability information for operating the UE itself to a BS.

Secondly, a UE does not perform a beam management operation during a configured beam management region. Yet, the UE may send a message that makes a request for relaxed beam management ability information for operating the UE itself to a BS.

TABLE 6

| P1-B beam management ability information index | Tx beam steering maximum range K (degree) of gNB | Maximum steering available beam number M within Tx beam steering maximum range K | Maximum time (transition time) T required for steering with single Tx step beam | Rx beam steering maximum available beam number Mr | Maximum time Tr required for steering with single Rx step beam |
|---|---|---|---|---|---|
| 00 | 10 degrees | 10 | 100 ns | 5 | 1 μs |
| 01 | 20 degrees | 100 | 60 ns | 5 | 0.5 μs |
| 10 | 30 degrees | 300 | 50 ns | 10 | 1 μs |
| 11 | 40 degrees | 1000 | 50 ns | 10 | 1 μs |

When a specific system frame structure is given and a time for maintaining a pair of BS Tx beam and UE Rx beam is fixed (e.g., a BS Tx/UE Rx beam pair maintained time '1 μs'), Table 6 shows that a beam management region is configured. In Table 6, when a P1-B beam management ability information index is 00, if a BS transmits RSs or preambles for a single Tx bean for 1 frame (e.g., 1 μs) in the corresponding frame structure, since 10 Tx beams exist, RSs/preambles corresponding to a 10-μs Tx beam are configured. In addition, since T (e.g., 0.1 μs) occurs 10 times in consideration of each transition, total 11 μs is necessary according a single Rx beam of a UE. In addition, since the Proposal 6-4

A UE satisfied with beam management ability configured by a BS may operate as follows.

Firstly, a UE performs a beam management operation but may not operate beam management on a beam pair remaining in a beam management region.

Secondly, for a beam pair region remaining in a beam management region, a UE selects Rx beams to perform a beam management RS/preamble measurement once more in response to a Tx beam of a BS and may then measure a corresponding RS or preamble using them as a beam pair.

Proposal 6-5

Beam management ability information notified to a UE by a BS may be configured according to mechanical or non-mechanical beam steering or in hybrid form as shown in Table 7 below.

TABLE 7

| Beam management ability information | Tx beam steering maximum range K (degrees) of gNB | | | Maximum steering available beam number M within Tx beam steering maximum range K | | | Maximum time (transition time) Tm required for mechanical steering with single Tx step beam | Maximum time (transition time) Tn required for non-mechanical steering with single Tx step beam |
|---|---|---|---|---|---|---|---|---|
| index | Total | Mechanic | Non-mechanical | Total | Mechanic | Non-mechanical | | |
| 00 | 40 | 30 | 10 | 10 | 2 | 5 | 100 ns | 10 μs |
| 01 | 50 | 40 | 10 | 100 | 2 | 50 | 60 ns | 10 μs |
| 10 | 60 | 50 | 10 | 300 | 3 | 100 | 50 ns | 10 μs |
| 11 | 70 | 50 | 20 | 1000 | 10 | 100 | 50 ns | 10 μs |

Figure 19:
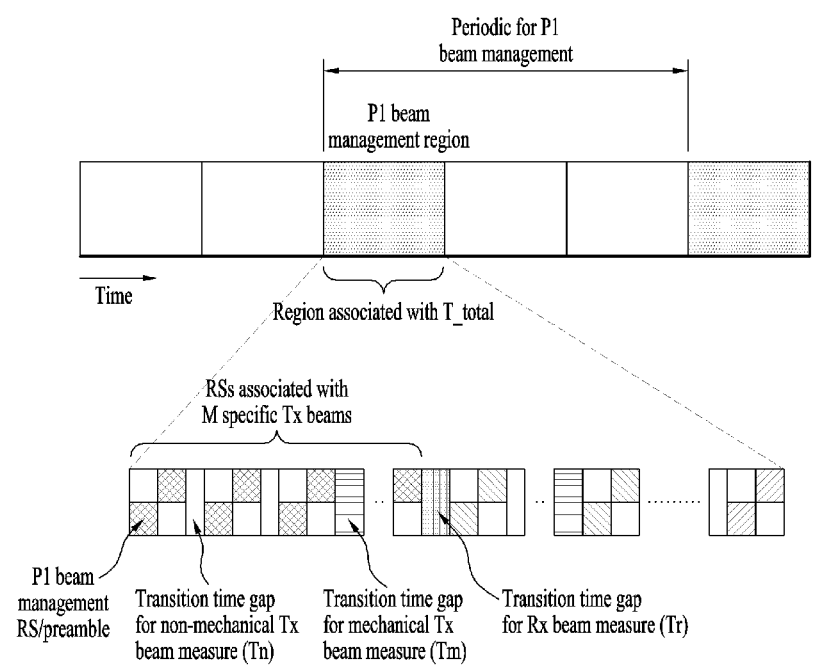
FIG. 19 shows a method of configuring a periodic beam management region for P1 operation in the hybrid structure of mechanical beam steering and non-mechanical beam steering.

FIG. 19 shows a periodic beam management region configuring method for a P1 operation (hybrid example).

A position of a transmission gap by mechanical or non-mechanical beam steering in a single beam management region may be transmitted as a bitmap through RRC. This bitmap may indicate a mechanical or non-mechanical beam steering transition position in M BS beams associated with a specific UE Rx beam and may be applicable repeatedly each time a UE Rx beam changes. Alternatively, using a function, a mechanical beam management gap and a non-mechanical beam measurement gap may be classified.

In $$\arg_k(N - k + \Delta) = 0,$$

N indicates an instance in which M BS beams associated with a specific UE Rx beam are steered, k indicates an index of a region in which a measurement gap is generated. When $\Delta$ is an offset, a measurement gap of an index of a position k satisfying the above equation is designated as a mechanical measurement gap or a non-mechanical measurement gap. $\Delta$ may be configured through higher layer, MAC-CE or DCI.

When a beam management ability information index in Table 7 that shows an example of a mechanical or non-mechanical beam steering gap position through a bitmap is 00, the bitmap may be represented as 10 bits (0000100001). Hence, a UE expects a measurement gap to which '0' corresponds as a gap corresponding to non-mechanical beam steering and also expects a measurement gap to which '1' corresponds as a gap corresponding to mechanical beam steering.

Proposal 7

Optionally, a BS may configure a beam management region for L Tx beam management by determining a specific number of L (<M) among the maximum Tx beam number M within K. This beam management region may be indicated through L3 (e.g., higher layer, RRC) with a periodic triggering property, L2 (e.g., MAC-CE) with a semi-persistent triggering property, or L1 (e.g., DCI) with an aperiodic triggering property. The L value is transmitted by being accompanied when the beam management region is triggered.

Proposal 8

The number of BM RSs/preambles within a single beam management region may become N×M when the minimum number of RSs/preambles required for detection of a single Tx/Rx pair is set to N. Assuming that a time for maintaining a single Tx/Rx beam pair is set to Ts (or, Ts may be substituted with the frame/subframe/slot/symbol number Ns for maintaining Tx/Rx), the density of RSs/preambles on a time/frequency resource allocated to the configured Tx/Rx pair may become $$\frac{N \times M}{Ts} \text{ or } \frac{N \times M}{Ns}.$$

Proposal 9

A set of the above beam management ability informations is configured through RRC (higher layer), and lowest, highest or average beam management ability information is configured as default for UEs through RRC (higher layer). UEs connected to the corresponding link feed back UE beam management capability information in form of L1 (UCI) and/or L2 (MAC-CE). The UE beam management capability information may be similar to beam management ability information of a BS. The BS refers to the received UE beam management capability informations, thereby updating latest bam management ability information. A beam management update message containing the updated beam management ability information is sent to UEs through L2 (MAC-CE) and/or L1 (DCI). The beam management update message carries the updated beam management region information. Alternatively, the updated beam management region is reconfigured through an L3 (RRC) message. Meanwhile, if a UE operates in the defaulted configuration at first and then transmits capability information to a BS, it may operate in configuration optimized for the UE correspondingly.

The scope of the system to which Proposals 1 to 9 proposed by the present disclosure may be extended to other systems (e.g., UURA, etc.) other than the 3GPP LTE system, and more particularly, to 5G and Beyond 5G.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into a first layer L1, a second layer L2 and a third layer L3 based on the three lower layers of Open System Interconnection (OSI) model well known to communication systems. A physical layer belongs to the first layer and provides an information transfer service via a physical channel. A Radio Resource Control (RRC) layer belongs to the third layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

The above-mentioned embodiments correspond to combinations of elements and features of the present disclosure in prescribed forms. And, it is able to consider that the respective elements or features are selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present disclosure has been described and illustrated herein with reference to the preferred embodiments thereof, it will be apparent to those skilled in the art that various modifications and variations can be made therein without departing from the spirit and scope of the invention. Thus, it is intended that the present disclosure covers the modifications and variations of this invention that come within the scope of the appended claims and their equivalents.

MODE OF DISCLOSURE

Various modes for implementation of the disclosure are described in BEST MODE FOR DISCLOSURE.

The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of transmitting feedback information in a wireless communication system and apparatus therefor are industrially applicable to the 5G communication system, etc.

What is claimed is:

1. A user equipment (UE) in performing beam management in a wireless communication system, the user equipment comprising:
a Radio Frequency (RF) unit; and
a processor configured to receive information including a beam management region from a base station by controlling the RF unit,
wherein the beam management region comprises a Reference Signal (RS) and preamble region, a first transition time region for Tx (transmitted) beam steering, and a second transition time region for Rx (received) beam steering.

2. The user equipment of claim 1, wherein the information including the beam management region has a transmission priority lower than that of transmission/reception of a transmission region for an initial access and higher than that of transmission/reception of a different downlink and uplink channel.

3. The user equipment of claim 1, wherein the beam management region further comprises at least one of a maximum range of the Tx beam steering of the base station, a maximum value of a steering available beam within the maximum range, a time required for steering with a single step beam, a beam management period for finding an optimal beam pair within the maximum range, or a resource deployment information of the RS in the beam management period.

4. The user equipment of claim 1, wherein a parameter indicating a beam management operation of the base station and user equipment is mapped to the RS and preamble region and wherein the parameter comprises one of P1 of steering both of a base station Tx beam and a user equipment Rx (received) beam, P2 of steering the base station Tx beam only, or P3 of steering the user equipment Rx beam only.

5. The user equipment of claim 4, wherein the processor determines whether the user equipment is capable of performing the beam management according to the beam management operation indicated by the parameter.

6. The user equipment of claim 5, wherein based on determining that the user equipment is capable of performing the beam management according to the beam management operation indicated by the parameter, the processor performs the beam management operation in a manner of skipping the beam management operation for a beam pair region remaining in the beam management region.

7. The user equipment of claim 5, wherein based on determining that the user equipment is not capable of performing the beam management according to the beam management operation indicated by the parameter, the processor transmits a message about the beam management operation that can be performed by the user equipment to the base station.

8. The user equipment of claim 1, wherein the beam management region is transceived through one of Radio Resource Control (RRC), System Information Block (SIB), or Master Information Block (MIB).

9. The user equipment of claim 1, wherein the RF unit further comprises at least one of an external lens, a hyper-hemispherical lens, a phase shifter, or an attenuator.

10. The user equipment of claim 9, wherein the processor further comprises a non-mechanical beam steering controller and wherein the non-mechanical beam steering controller primarily steers an incident beam through the phase shifter and the attenuator by controlling the hyper-hemispherical lens.

11. The user equipment of claim 10, wherein the processor further comprises a mechanical beam steering controller and wherein the mechanical beam steering controller secondarily steers the primarily steered beam by controlling the external lens.

12. The user equipment of claim 9, wherein the first transition region further comprises a region related to non-mechanical beam steering and a region related to mechanical beam steering.

13. The user equipment of claim 12, wherein positions of the region related to the non-mechanical beam steering and the region related to the mechanical beam steering are designated through a bitmap.

14. A method of performing beam management by a user equipment in a wireless communication system, the method comprising:
   receiving information including a beam management region from a base station,
   wherein the beam management region comprises a Reference Signal (RS) and preamble region, a first transition time region for Tx (transmitted) beam steering, and a second transition time region for Rx (received) beam steering.

* * * * *